United States Patent
Butter et al.

(10) Patent No.: US 6,772,527 B1
(45) Date of Patent: Aug. 10, 2004

(54) MODULAR MEASUREMENT DEVICE

(75) Inventors: Andrew G Butter, Wotton-under-Edge (GB); Graham A Hellen, Bristol (GB)

(73) Assignee: Renishaw PLC, Wotton-Under-Edge (GB)

( * ) Notice: Subject to any disclaimer, the term of this patent is extended or adjusted under 35 U.S.C. 154(b) by 0 days.

(21) Appl. No.: 10/409,207

(22) Filed: Apr. 9, 2003

(51) Int. Cl.$^7$ .................................................. G01B 5/20
(52) U.S. Cl. ........................................... 33/503; 33/557
(58) Field of Search .......................... 33/503, 556, 557, 33/558, 559, 560, 561

(56) References Cited

U.S. PATENT DOCUMENTS

| | | | | |
|---|---|---|---|---|
| 4,631,834 A | * | 12/1986 | Hayashi et al. ................ | 33/503 |
| 4,658,509 A | * | 4/1987 | Juengel ........................ | 33/558 |
| 4,997,287 A | * | 3/1991 | Tittl ............................. | 33/560 |
| 5,056,235 A | * | 10/1991 | Thomas ........................ | 33/503 |
| 5,251,156 A | * | 10/1993 | Heier et al. ................... | 33/559 |
| 5,327,657 A | * | 7/1994 | Hajdukiewicz et al. ....... | 33/503 |
| 5,394,757 A | * | 3/1995 | Workman et al. ............. | 33/559 |
| 5,404,649 A | | 4/1995 | Hajdukiewicz et al. ....... | 33/503 |
| 6,430,828 B1 | * | 8/2002 | Ulbrich ........................ | 33/503 |
| 6,430,833 B1 | | 8/2002 | Butter et al. .................. | 33/559 |
| 6,543,150 B2 | * | 4/2003 | Matsumiya et al. .......... | 33/553 |

\* cited by examiner

*Primary Examiner*—Christopher W. Fulton
(74) *Attorney, Agent, or Firm*—Oliff & Berridge PLC

(57) ABSTRACT

The invention provides a modular measurement device 100 having, attachable to the quill 12 of a CMM, any one of a plurality of stylus support modules 120ab, 120cd, or 120ef. Attachable to a stylus support module is a range of stylus modules 110a–f. The stylus support modules have different spring rates to ensure that a near optimum response can be obtained for each stylus module used. The stylus modules may be configured so that each cannot be mistakenly fitted to the wrong stylus support module. The modules are held together by magnetic attraction, and the strength of attraction is cascaded so that the stylus module is removed first if pulled off.

18 Claims, 4 Drawing Sheets

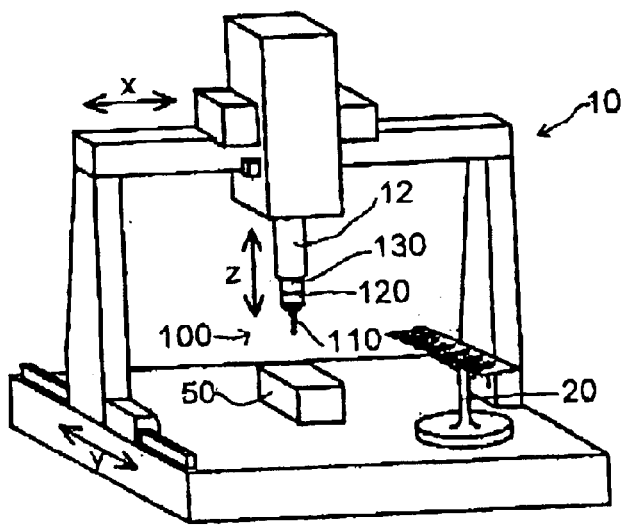
Fig 1
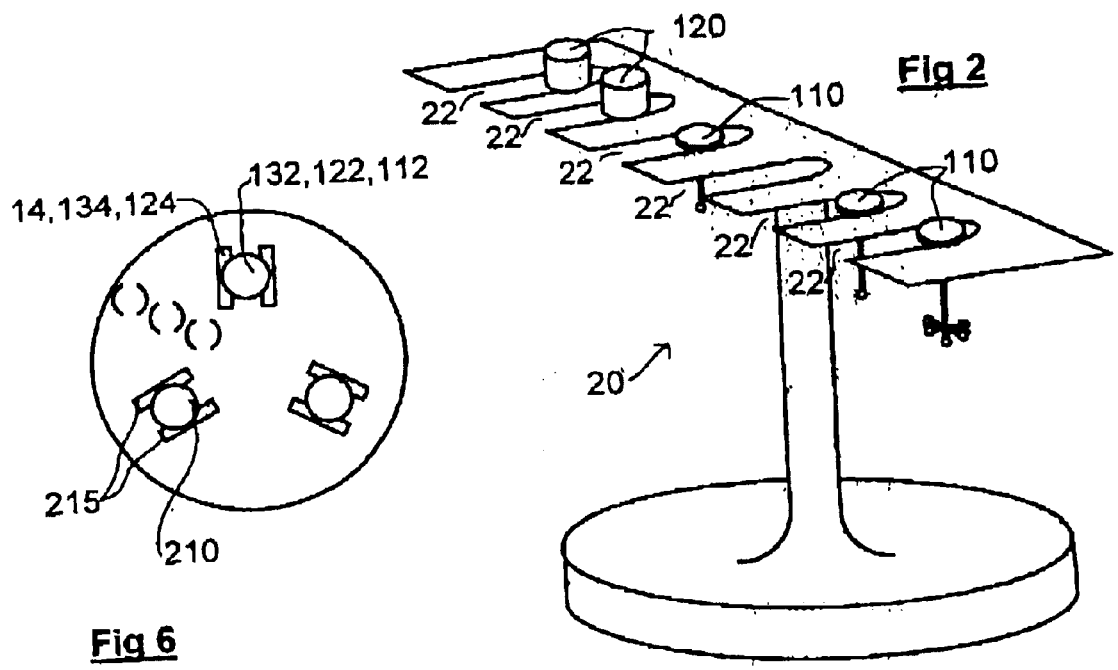
Fig 2
Fig 6

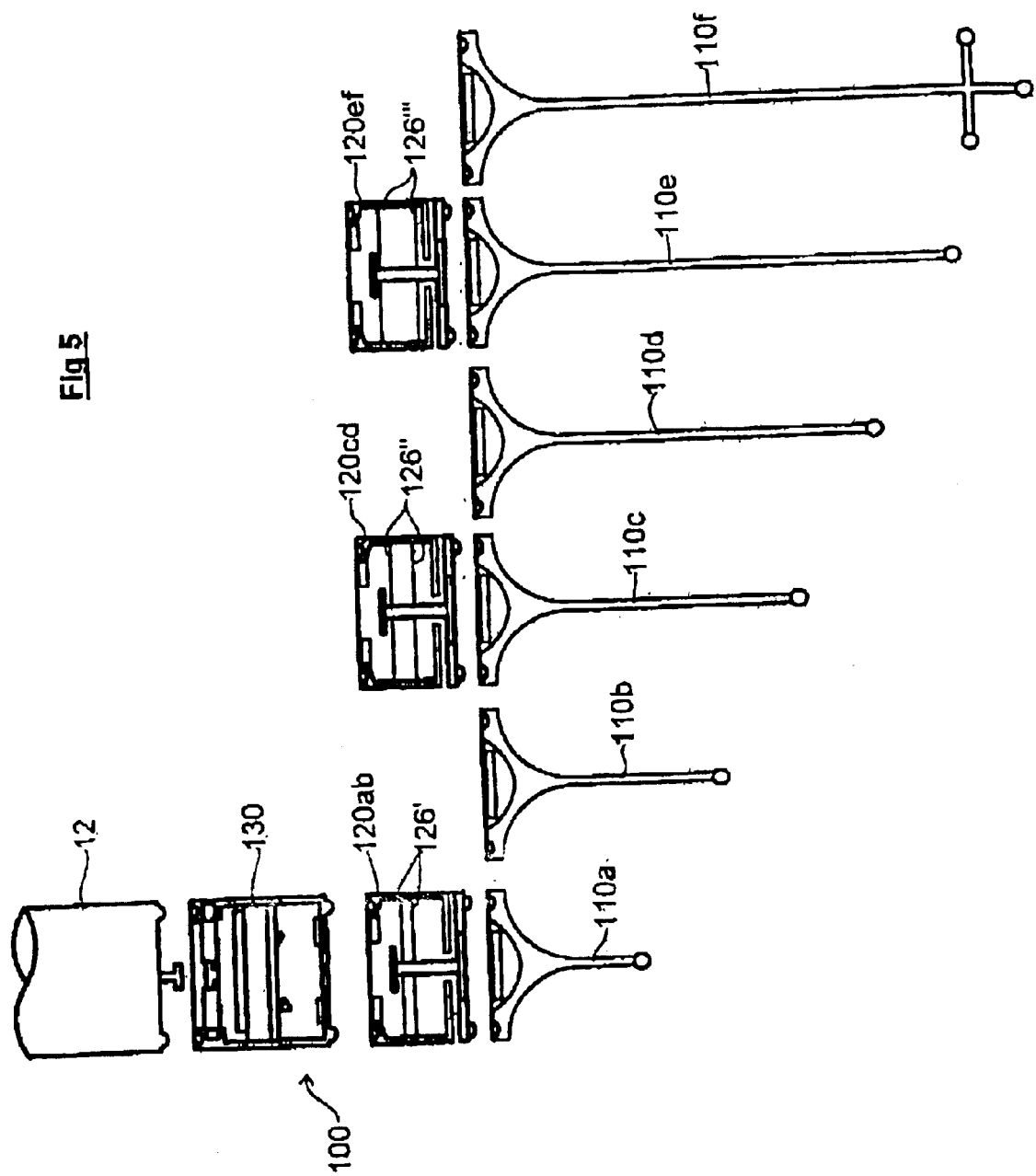

MODULAR MEASUREMENT DEVICE

BACKGROUND OF THE INVENTION

1. Field of the Invention

The present invention relates to a modular measurement device for example a measurement probe, for use on positioning apparatus such as a coordinate measurement machine, a machine tool, robots, non cartesian machines or the like.

2. Description of the Related Prior Art

Measurement probes are known (e.g. U.S. Pat. No. 5,404, 649) which have a number of stylus modules releasably attachable to a sensor module for producing a signal indicative of the movement of the stylus module relative to the sensor module. A range of stylus modules are provided which have different lengths or configurations, allowing the probe to be used for different measurement tasks.

However, a sensor module that has to have a large range of styli is generally designed as a compromise and probing forces for each stylus used will be different. The sensor module has to be strong enough to support the stylus used and to allow movement of the stylus. If a short stylus is used and a sensor is designed for a longer stylus then the measurement device will be less than optimally sensitive. A plurality of sensor modules each of which is designed for use with just one stylus would be ideal, but is very expensive for the customer. U.S. Pat. No. 6,430,833 shows a separable sensor and stylus support mechanism. However, the use of a range of styli is not addressed.

SUMMARY OF THE INVENTION

The present invention provides a modular measurement device comprising: a retaining module attachable to a positioning apparatus; at least one stylus support module being exchangeably attachable to the retaining module; and at least one stylus module being exchangeably attachable to a stylus support module,
wherein the stylus support module has a suspension system for movably supporting the stylus module, wherein the retaining module and the stylus support module cooperate to measure displacement of the suspension system, and wherein the exchangeable attachment of the stylus module to the stylus support module is formed by complementary mountings on the stylus module and the stylus support module, allowing a repeatable rest position of the stylus module relative to the stylus support module following exchange.

Preferably the complementary mountings form a kinematic mounting. Preferably a plurality of stylus support modules and stylus modules are provided, the stylus modules are grouped and each group of stylus modules is configured such that it may be attached only to one of the plurality of stylus support modules.

Preferably each respective exchangeable attachment includes a magnetic attraction device.

Preferably the magnetic attraction force exerted by each respective attachment differs.

The invention provides also a modular measurement device comprising: a retaining module attachable to a positioning apparatus; a plurality of stylus support modules being exchangeably attachable to the retaining module; and a plurality of stylus modules being exchangeably attachable to a stylus support module,
wherein each stylus support module has a suspension system for movably supporting the stylus module, the retaining module and the stylus support module cooperate to measure displacement of the suspension system and the suspension system of at least one of the stylus support modules has a different configuration from that of at least one of the other of the stylus support modules.

Thereby embodiments of the invention provide for one sensor module which can have a range of styli attached thereto via a smaller range of styli support modules intermediate the sensor and the styli.

Preferably the suspension system includes spaced resilient elements and the different configuration includes a different spacing between the elements.

Preferably each stylus has a work contacting area and the degree of movement per unit force applied to the work contacting area of each stylus module is approximately equal when attached to a stylus support module.

Preferably the plurality of stylus modules are grouped and each group of stylus modules is configured such that it may be attached only to one of the plurality of stylus support modules.

Preferably the configuration of each group allows only one orientation of the stylus modules in the group relative to the stylus support module to which they are attachable. This means that a stylus module can be removed and replaced in the same place, giving better repeatability of measurement if stylus modules are removed and replaced.

Preferably the releasable attachments between the retaining module and the stylus support modules or between the stylus support modules and the stylus modules, forms a kinematic mounting.

Preferably the exchangeable attachments between the retaining module and the stylus support modules or between the stylus support modules and the stylus modules includes magnetic attraction.

Preferably there exists magnetic attraction between the retaining module and the stylus support modules, and between the stylus support modules and the stylus modules and the magnetic attraction is greater between the retaining module and the stylus support modules.

In use of modular measurement systems for example of the type mentioned above, it is often desirable to have machine driven exchange of various modules in the system. U.S. Pat. No. 5,404,649 shows such an arrangement.

If modules are stacked and held together by magnetic attraction it will be difficult to control the sequence of release of the stack e.g. when trying to remove the outer most module of the stack the inner most module might come away instead.

The invention extends also to a stacked modular measurement system having at least three modules in a stack held together by means of magnetic attraction between adjacent modules wherein the attraction between one pair of the adjacent modules is not equal to the attraction between another pair of adjacent modules.

Thus in embodiments of the invention the module at the free end will be removed before the module at the machine end if the stack is pulled at its free end. This allows a more simple routine for changing modules of the machine. In embodiments the invention allows simple movements to change modules when modules are stored on a rack on a measurement machine.

Preferably the stack has an end mountable to a machine and a free end and the module at the free end has less attraction to its adjacent module than the attraction of the module at the machine end and its adjacent module.

The invention extends also to a modular measurement system comprising a modular measurement device including: a retaining module attachable to a positioning apparatus; at least one stylus support module being exchangeably attachable to the retaining module; at least one stylus module being exchangeably attachable to a stylus support module, wherein the stylus support module has a suspension system for movably supporting the stylus module, the retaining module and the stylus support module cooperate to measure displacement of the suspension system and the exchangeable attachment of the stylus module to the stylus support module is formed by complementary mountings on the stylus module and the stylus support module allowing a repeatable rest reposition of the stylus module relative to the stylus support module following exchange, and the system further comprising a rack for storing any of the modules when not in use.

The invention extends also to a modular measurement system comprising a modular measurement device including: a retaining module attachable to a positioning apparatus; a plurality of stylus support modules being exchangeably attachable to the retaining module; a plurality of stylus modules having a work contact area and being exchangeably attachable to a stylus support module, wherein the stylus support module has a suspension system for movably supporting the stylus module, the retaining module and the stylus support module cooperate to measure displacement of the suspension system and the suspension system of each stylus support module has a different configuration, and the system further comprising a rack for storing any of the modules when not in use.

DESCRIPTION OF THE PREFERRED EMBODIMENTS

Embodiments of the invention will now be described with reference to the drawings, wherein:

FIG. 1 shows a measurement machine incorporating a modular measurement device according to the invention;

FIG. 2 shows a storage rack for storing elements of a modular measurement device according to the invention;

FIG. 5 shows a complete set of modular elements performing a modular measurement device according to the invention; and FIG. 6 shows details of the measurement device according to the invention as shown in FIGS. 3 and 4.

Figure 3:
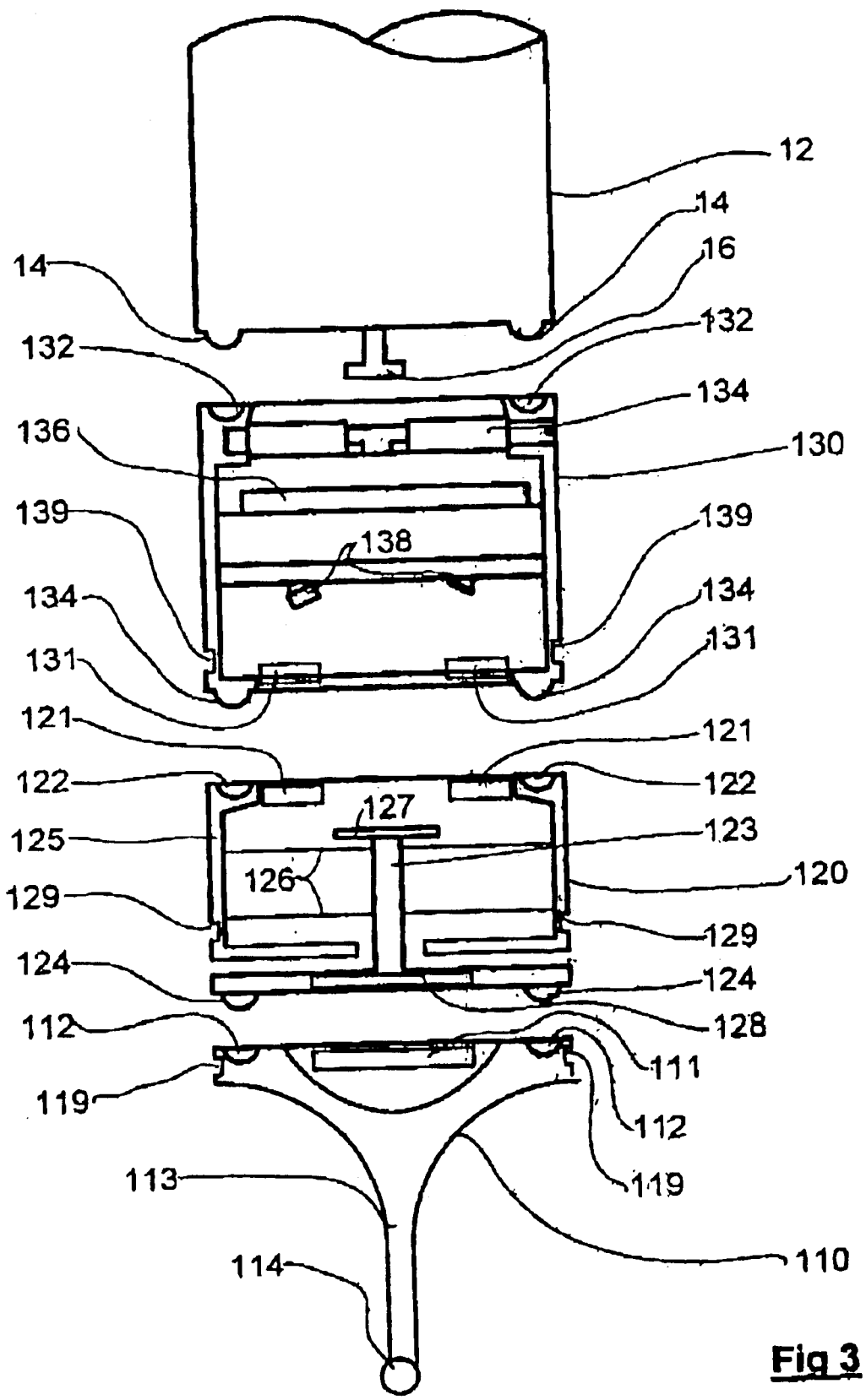
FIG. 3 shows one set of elements from a plurality forming a measurement device according to the invention in a disassembled condition.

FIG. 1 shows a coordinate measurement machine (CMM) 10. The machine has a measurement device 100 which can be moved by the machine in the directions X, Y and Z. The measurement device 100 includes a stylus 110 which can be used to contact a workpiece (e.g. block 50). The measurement device produces a signal when contact between the workpiece and the stylus 110 is made. In this embodiment the signal is an analogue signal but a more simple on/off signal is possible.

The CMM needs varying shapes of styli in order that all shapes of workpiece can be measured. Short straight styli can be used for many situations but deep bores, overhangs and the like will require a different stylus. This CMM has a storage rack 20 in which those different styli 110 can be stored. The CMM has a controller (not shown) which as well as moving the stylus around the workpiece 50, can move the measurement device to the rack 20 where stylus changing can take place.

Now, since the leverage exerted on the stylus support modules by short styli is different to the leverage exerted by long styli it is desirable to have stylus support modules 120 which can be changed also to provide approximately equal probing force for each stylus module used. The support modules 120 can thus be matched to the length of the stylus. This matching is even more important when the measurement device 100 is attached to an articulating head so that the stylus can extend for example horizontally. In such instances a stronger stylus support is required if a longer or heavier stylus is used.

FIG. 3 shows in detail the modular measurement device 100. The so-called quill 12 of the CMM 10 is shown, to which the modular measurement device 100 is attachable. A tee connector 16 and location points 14 are used to secure and hold a sensor module 130. The sensor module 130 has complementary location points 132 and a hooked cam 135 for holding the tee connector 16.

Whilst the sensor module 130 is removable from the quill 12, in normal use it is envisaged that it will be attached permanently to the quill 12. The sensor module includes electronics 136, a light emitter and light receiver pair 138. Also included in the sensor module are magnets 131, location points 134 and a removal groove 139.

A stylus support module 120 is attachable releasably to the sensor module 130 by means of magnetic attraction. Location points 122 are provided which are complementary to the location points 134 on the sensor module 130. The stylus support module includes magnets 121 which are adjacent magnets 131 when the stylus support module is attached to the sensor module. A magnetic attraction force between the magnets 131 and the magnets 121 holds the stylus support to the sensor module with an attraction of approximately 20N.

The stylus support module includes a yoke 123 which is mounted to an outer casing 125 via a suspension system comprising support springs 126. The yoke is capable of constrained resilient movement in the aforementioned X, Y and Z directions. A mirror 127 is mounted to top of the yoke for reflecting light emitted by the light emitter of sensor 138. The stylus support module has a groove 129 in casing 125 for its removal from the sensor module 130.

Releasably attachable to the stylus support module is a stylus module 110. The stylus module is held to the stylus support module by means of the magnetic attraction force between magnet 128 in the stylus support module and magnet 111 in the stylus module. The attractive force between the stylus module and the stylus support module is approximately 10N. Complementary location points 124 and 112 are provided also. The stylus module includes a stylus stem 113 and a stylus ball 114 which contacts the workpiece 50. The stylus module has a groove 119 to aid its removal from the stylus support module 120.

The arrangement shown in U.S. Pat. No. 6,430,833 is similar to that described above and the arrangement in U.S. Pat. No. 6,430,833 could be used as an alternative, its disclosure being incorporated herein by reference.

Figure 4:
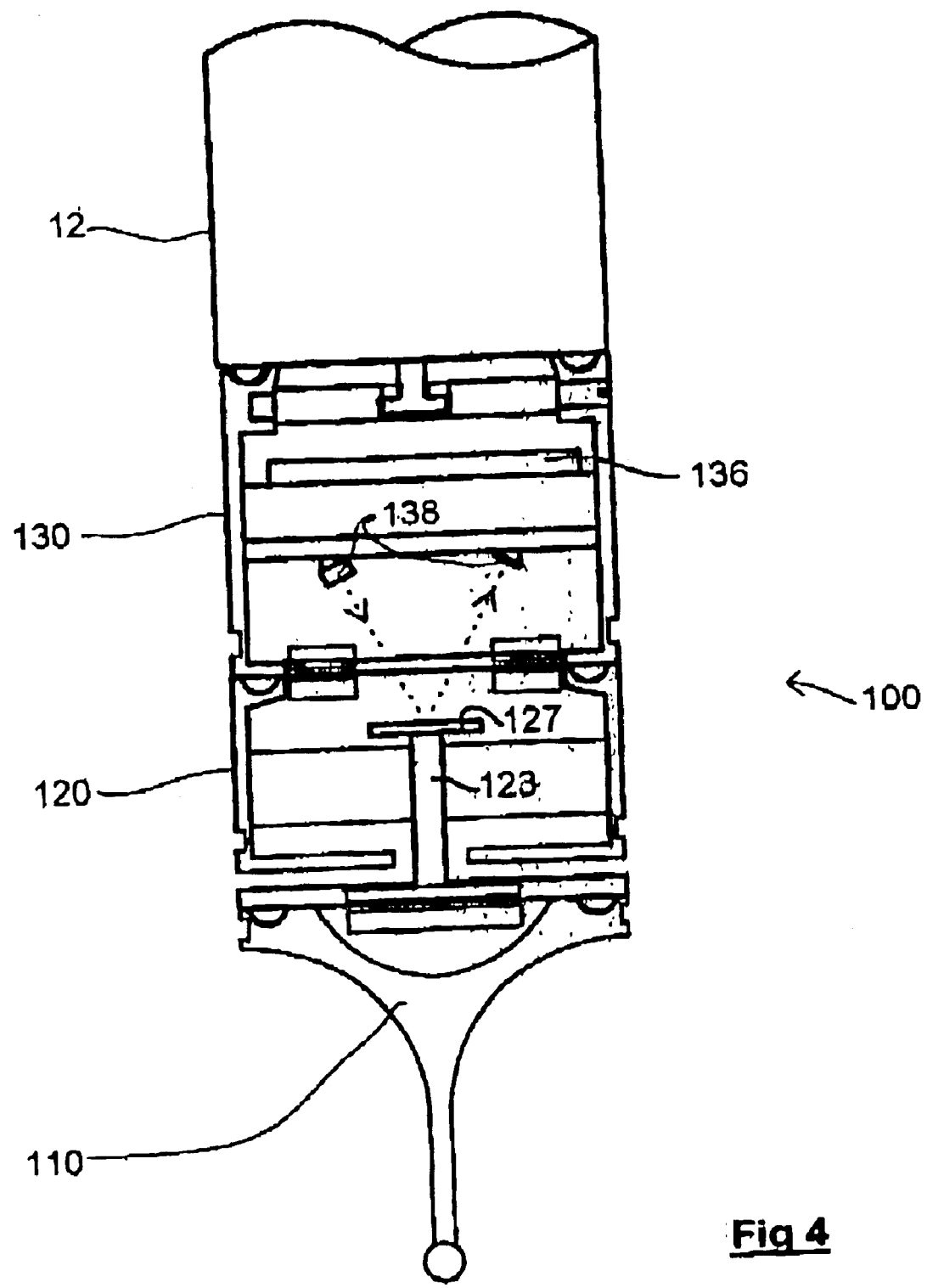
FIG. 4 shows the measurement device of FIG. 3 in an assembled condition.

FIG. 4 shows an assembled modular measurement device 100. Light from the emitter of the sensor 138 is shown being reflected from mirror 127 to the light receiver of the sensor 138. In use of the modular measurement device mirror 127 is moved by the sprung yoke 123, connected to the stylus module 110. Thus movement of the stylus ball 114 causes movement of the mirror which is detected by the sensor 138 and turned into a signal by electronics 136.

FIG. 5 shows a quill 12, a sensor module 130, a plurality of stylus support modules 120*a,b*,120*cd* and 120*ef*, all connectable to the stylus module 130. Each stylus support module has springs 126 of varying configuration. Springs 126' fitted to the stylus support module 120*ab* are used to support the shortest stylus modules 110*a* and 110*b*. Springs 126Δ which are further apart than springs 126' are fitted to stylus support module 120*cd* and are used to support stylus modules 110*c* and 110*d*. Similarly springs 126''' are further apart again than springs 126'' and are used with stylus support module 120*ef* for supporting longer stylus modules 110*e* and 110*f*. The springs 126',126'' and 126''' provide the appropriate (and approximately equal) level of force at the stylus ball 114.

The modular measurement device 110 is made up of a stack consisting of a sensor module 130, any one of the three stylus support modules 120 and an appropriate stylus module 110. The configuration of the springs 126 can thus be approximately optimised for each group of stylus modules 110*a/b*,110*c/d* or 110*e/f*.

In order that the wrong stylus is not attached to a stylus support module a unique configuration of a protrusion and recess can be incorporated into the top of the stylus module, and/or into the stylus support module so that only one group of stylus modules will fit the appropriate stylus support module.

Referring to all the figures during stylus module changing the groove 119 of each module is inserted horizontally into a slot 22 on the storage rack 20. The quill 12 is moved up and the stylus is pulled off the stylus support module. The stylus support module does not stay with the stylus module because the attractive force between the stylus support module and the sensor module is greater than the attractive force between the stylus support module and the stylus module.

If it is required that the stylus support module is changed also then the quill moves the groove 139 of the stylus support module into a slot 22 on the rack and moves upwardly to pull the stylus support module from the sensor module.

Replacement of the stylus support module and stylus module is the reverse of their removal.

FIG. 6 shows a typical set of complementary location points 14/32, 134/122, or 124/112. The illustrated location is of a kinematic type which allows repeatable repositioning of the locators in the same rest position following separation and replacement. In this instance three equi-spaced balls 210 form one half of a set of location points. The other half of the location points is formed by three pairs of roller 215, each ball being seated between each roller pair. Other arrangements of location points are possible provided six points of contact are established between the modules which are located together. The location points provide a means for exchangeably attaching one module to another.

Many variants are possible within the ambit of the invention. Modular contact measurement devices have been described and illustrated, however other modular measurement devices are envisaged, e.g. devices that do not contact a workpiece but merely measure the change in capacitance or some other variable as the measuring implement moves closer to the workpiece.

In the embodiment shown a simplified sensor 138 is shown. In practice this sensor will include a further light emitter and receiver pair for sensing movement in more than one direction. However other displacement sensors could be used. Two parallel springs 126 are shown. However, other arrangements of springs could be used. It is preferred that the spacing between the springs is varied, however the spring's stiffness could be altered to give similar results.

The sensor 138 has been shown in the sensor module 130. However, the sensor may be mounted in the stylus support module 120. Thus in the claims the sensor module is referred to as a retaining module.

Three stylus support modules are illustrated for use with three groups of stylus modules each group having two stylus modules. More or less stylus support modules or stylus modules are possible.

The invention has been described for use with a CMM however any machine capable of measurement could employ the modular measurement device described herein.

What is claimed is:

1. A modular measurement device comprising:
    a retaining module attachable to a positioning apparatus;
    at least one stylus support module being exchangeably attachable to the retaining module; and
    at least one stylus module being exchangeably attachable to said at least one stylus support module,
    wherein the stylus support module has a suspension system for movably supporting the stylus module,
    wherein the retaining module and the stylus support module cooperate to measure displacement of the suspension system, and
    wherein the exchangeable attachment of the stylus module to the stylus support module is formed by complementary mountings on the stylus module and the stylus support module, allowing a repeatable rest position of the stylus module relative to the stylus support module following exchange.

2. A modular measurement device as claimed in claim 1 wherein the complementary mountings form a kinematic mounting.

3. A modular measurement device as claimed in claim 1 wherein a plurality of stylus support modules and stylus modules are provided.

4. A modular measurement device as claimed in claim 3 wherein the plurality of stylus modules are grouped and each group of stylus modules is configured such that it may be attached only to one of the plurality of stylus support modules.

5. A modular measurement device as claimed in claim 1 wherein each respective exchangeable attachment includes a magnetic attraction device.

6. A modular measurement device as claimed in claim 5 wherein the magnetic attraction force exerted by each respective attachment differs.

7. A modular measurement device comprising:
    a retaining module attachable to a positioning apparatus;
    a plurality of stylus support modules being exchangeably attachable to the retaining module; and
    a plurality of stylus modules each being exchangeably attachable to one of said plurality of stylus support modules,
        wherein each stylus support module has a suspension system for movably supporting the stylus module, the retaining module and each of the stylus support module cooperate to measure displacement of the suspension system and the suspension system of at least one of the stylus support modules has a different configuration from that of at least one of the other of the stylus support modules.

8. A modular measurement device as claimed in claim 7 wherein the suspension system includes spaced resilient elements and the different configuration includes a different spacing between the elements.

9. A modular measurement device as claimed in claim 7 wherein each stylus has a work contacting area and the degree of movement per unit force applied to the work contacting area of each stylus module is approximately equal when attached to a stylus support module.

10. A modular measurement device as claimed in claim 7 wherein the plurality of stylus modules are grouped and each group of stylus modules is configured such that it may be attached only to one of the plurality of stylus support modules.

11. A modular measurement device as claimed in claim 10 wherein the configuration of each group allows only one orientation of the stylus modules in the group relative to the stylus support module to which they are attachable.

12. A modular measurement device as claimed in claim 7 wherein the releasable attachments between the retaining module and the stylus support modules or between the stylus support modules and the stylus modules, forms a kinematic mounting.

13. A modular measurement device as claimed in claim 7 wherein the exchangeable attachments between the retaining module and the stylus support modules or between the stylus support modules and the stylus modules includes magnetic attraction.

14. A modular measurement device as claimed in claim 7 wherein there exists magnetic attraction between the retaining module and the stylus support modules, and between the stylus support modules and the stylus modules and the magnetic attraction is greater between the retaining module and the stylus support modules.

15. A stacked modular measurement system having at least three modules in a stack held together by means of magnetic attraction between adjacent modules wherein the attraction between one pair of the adjacent modules is not equal to the attraction between another pair of adjacent modules.

16. A stacked modular measurement system as claimed in claim 15 wherein the stack has an end mountable to a machine and a free end and the module at the free end has less attraction to its adjacent module than the attraction of the module at the machine end and its adjacent module.

17. A modular measurement system comprising a modular measurement device including:

a retaining module attachable to a positioning apparatus;

at least one stylus support module being exchangeably attachable to the retaining module;

at least one stylus module being exchangeably attachable to said at least one stylus support module, wherein the stylus support module has a suspension system for movably supporting the stylus module, the retaining module and the stylus support module cooperate to measure displacement of the suspension system and the exchangeable attachment of the stylus module to the stylus support module is formed by complementary mountings on the stylus module and the stylus support module allowing a repeatable rest reposition of the stylus module relative to the stylus support module following exchange, and the system further comprising a rack for storing any of the modules when not in use.

18. A modular measurement system comprising a modular measurement device including:

a retaining module attachable to a positioning apparatus;

a plurality of stylus support modules being exchangeably attachable to the retaining module;

a plurality of stylus modules having a work contact area and each being exchangeably attachable to one of said plurality of stylus support modules, wherein each of the stylus support module has a suspension system for movably supporting the stylus module, the retaining module and each of the stylus support module cooperate to measure displacement of the suspension system and the suspension system of each stylus support module has a different configuration, and the system further comprising a rack for storing any of the modules when not in use.

* * * * *